(12) United States Patent
Emsky

(10) Patent No.: US 8,016,107 B2
(45) Date of Patent: Sep. 13, 2011

(54) HOLDER FOR PORTABLE ELECTRONIC DEVICE

(76) Inventor: Timothy Emsky, Prince George (CA)

(*) Notice: Subject to any disclaimer, the term of this patent is extended or adjusted under 35 U.S.C. 154(b) by 181 days.

(21) Appl. No.: 12/344,822

(22) Filed: Dec. 29, 2008

(65) Prior Publication Data

US 2009/0230161 A1    Sep. 17, 2009

Related U.S. Application Data

(60) Provisional application No. 61/009,234, filed on Dec. 27, 2007.

(51) Int. Cl.
*B65D 85/00* (2006.01)
(52) U.S. Cl. ............... 206/320; 206/722; 248/312.1
(58) Field of Classification Search ........... 206/320, 206/576, 722, 701, 724, 305; 248/312.1, 248/309.1, 311.2; 224/257, 452
See application file for complete search history.

(56) References Cited

U.S. PATENT DOCUMENTS

| | | | |
|---|---|---|---|
| 6,206,187 B1* | 3/2001 | Van Winkle | 206/320 |
| 6,464,185 B1* | 10/2002 | Minelli et al. | 248/183.1 |
| 2006/0237495 A1* | 10/2006 | Chen et al. | 224/197 |
| 2007/0102612 A1* | 5/2007 | Seil et al. | 248/311.2 |
| 2007/0262112 A1* | 11/2007 | Butler et al. | 224/669 |
| 2009/0038970 A1* | 2/2009 | Leto | 206/320 |

* cited by examiner

*Primary Examiner* — Jacob K Ackun, Jr.
(74) *Attorney, Agent, or Firm* — Whiteford, Taylor & Preston, LLP; Gregory M. Stone, Esq.

(57) ABSTRACT

A holder for portable electronic devices is provided. The holder seats the portable electronic device upon a tray, and secures the device in such position preferably via a compression fit where the walls of the tray engage against and hold the edges of the device. The holder further provides a user the ability to adaptably position the display of the device relative to vertical or horizontal surfaces through use of a mounting assembly and support assembly that are connected to the back side of the tray.

17 Claims, 5 Drawing Sheets

HOLDER FOR PORTABLE ELECTRONIC DEVICE

CROSS REFERENCE TO RELATED APPLICATION

The present application is based upon and claims priority under 35 U.S.C. §119 from U.S. Provisional Application Ser. No. 61/009,234, filed on Dec. 27, 2007, which is incorporated herein by reference in its entirety.

FIELD OF THE INVENTION

The present invention generally relates to carrying and protective devices for portable electronic devices, and more particularly to a holder for carrying and protecting such portable electronic devices.

BACKGROUND OF THE INVENTION

Portable electronic devices, such as portable digital media players, are in wide use. For instance, portable digital music players, such as the APPLE IPOD™, are used by persons of all ages in various environments. The widely expanding use of such portable electronic devices has spawned a desire for accessories, including protective devices, carrying devices, and the like. As the electronic devices have advanced (e.g., digital music players adopting technology to make them portable digital video players), new challenges have been presented to provide functional carrying and protective devices without limiting the functionality of the device. Moreover, the ever increasing demand for the ability to use such devices in all environments, whether on the go (e.g., walking or jogging), traveling by car or plane, or simply sitting at a desk has likewise created challenges to provide such functional carrying and protective devices that are sufficiently adaptable to all such environments.

Therefore, it would be desirable to provide a device that provides various capabilities, such as carrying, mounting and protective capabilities, that is adaptable to promote the use of portable electronic devices in various environments.

SUMMARY OF THE INVENTION

Accordingly, the invention provides a holder for carrying and protecting portable electronic devices, such as digital media player devices (e.g., IPods™). In an exemplary preferred embodiment the holder includes a tray assembly that provides a tray with a first tray side upon which a portable electronic device may be seated. The tray further includes two side walls, a top wall and a bottom wall configured to engage at least a portion of the edges of the portable electronic device to secure the device upon the tray. The walls of the tray may secure the portable electronic device by, for instance, exerting a compression force from the walls of the tray against at least a portion of the edges of the portable electronic device. A second tray side of the tray has a mounting assembly that allows for the mounting of the holder against a vertical, nearly-vertical or non-horizontal surface.

With regard to another aspect of a particularly preferred embodiment of the invention, the holder also includes a support assembly attached to the second tray side of the tray for supporting the portable electronic device upon a generally horizontal surface. It is contemplated that the mounting and support assemblies, when not being used, allow the holder to maintain its generally slim profile by collapsing against the second tray side for storage.

With regard to yet another aspect of a particularly preferred embodiment of the invention, the walls of the holder include receiving assemblies configured to receive a user-adjustable strap. This allows the holder to be mounted for instance to a person, such as to an arm or leg, through the adjustable engagement of the strap against the person.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying drawings in which.

DETAILED DESCRIPTION OF THE INVENTION

Figure 1:
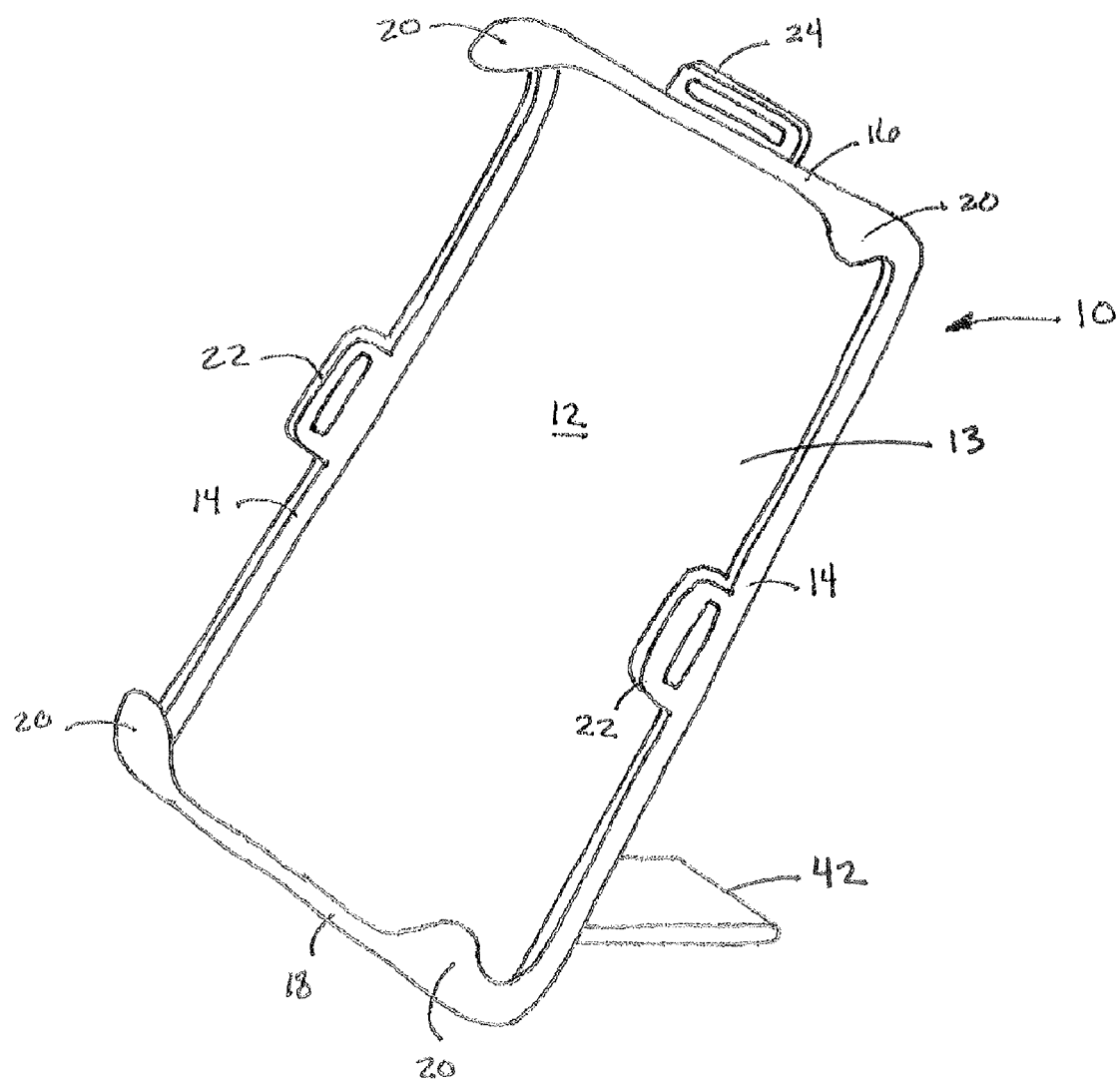
FIG. 1 is a perspective view of a holder including a tray assembly and support assembly for use with portable electronic devices in accordance with an exemplary embodiment of the present invention.

The invention summarized above may be better understood by referring to the following description, which should be read in conjunction with the accompanying drawings in which like reference numerals are used for like parts. The descriptive embodiment(s) set out below may enable one to practice an implementation of the invention; however, they are not intended to limit preferred embodiments, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 2:
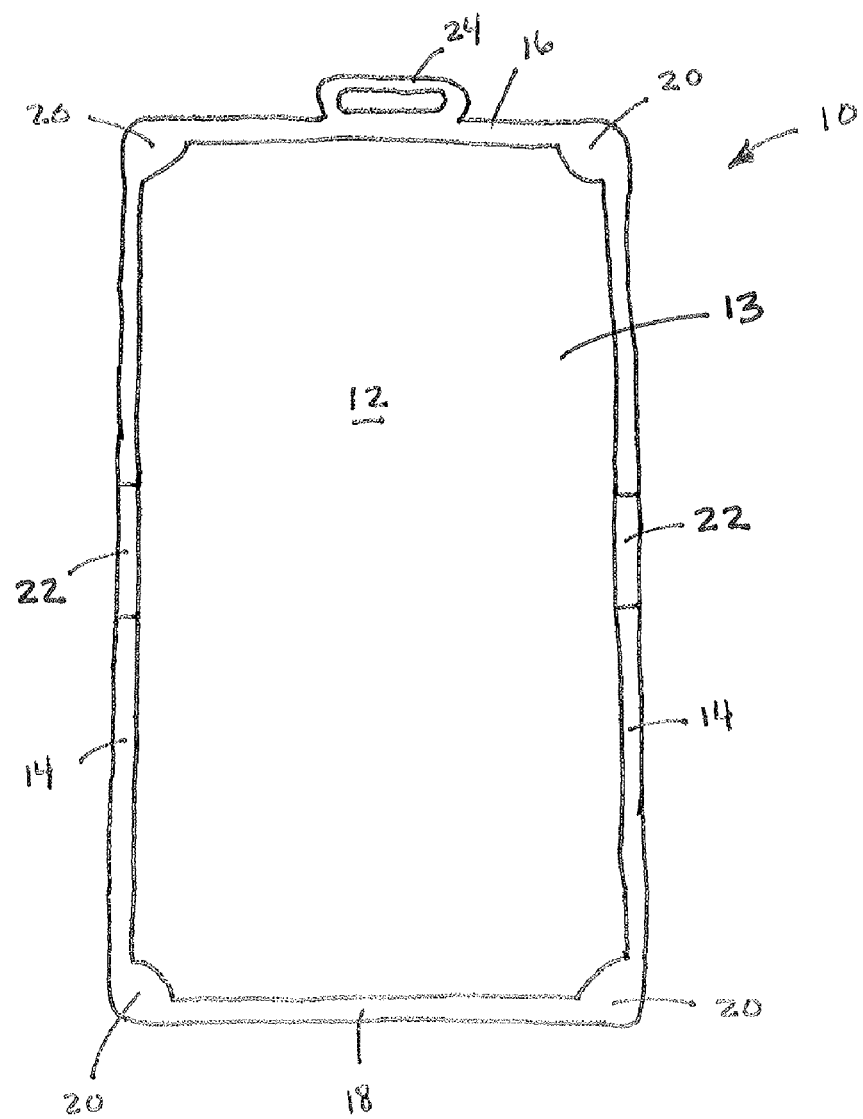
FIG. 2 is a front view of the holder of FIG. 1.

Disclosed is a protective holder and carrying device for a portable electronic device, such as a portable digital music player. As shown in the side, perspective view of FIG. 1 and the front view of FIG. 2, a holder (shown generally at 10) is provided. The holder 10 consists of a tray 12 including a first tray side 13 sized to receive a portable electronic device, such as a portable digital music player. Tray 12 is provided with a plurality of tray walls. In the current embodiment the tray walls include side walls 14, a top wall 16, and a bottom wall 18. Both top wall 16 and bottom wall 18 are provided rounded edges that terminate at opposite side ends in preferably rounded, protective corners 20. Preferably rounded, protective corners 20 are configured to overlap the corners of a portable electronic device when such device is seated within tray 12, thus holding the portable electronic device in place in tray 12 and serving as a protective cover without blocking any portion of the operational elements of the portable electronic device.

Preferably, the portable electronic device fits within tray 12 in a compression fit, and tray 12 is formed of a sufficiently resilient material to allow placement of the portable electronic device into tray 12 (past protective corners 20) and compressively hold the portable electronic device in place in tray 12. For instance, tray 12 may be formed of polyethylene, polypropylene or polyurethane. Likewise, tray 12 may be provided in a variety of length and width dimensions to receive portable electronic devices of various sizes.

In addition or alternatively, tray 12 may accept and seat the portable electronic device through the use of other technologies, such as adhesives, snap-fit, quick-connect, socket, or other such technologies as may be contemplated by those of ordinary skill in the art.

Figure 5:
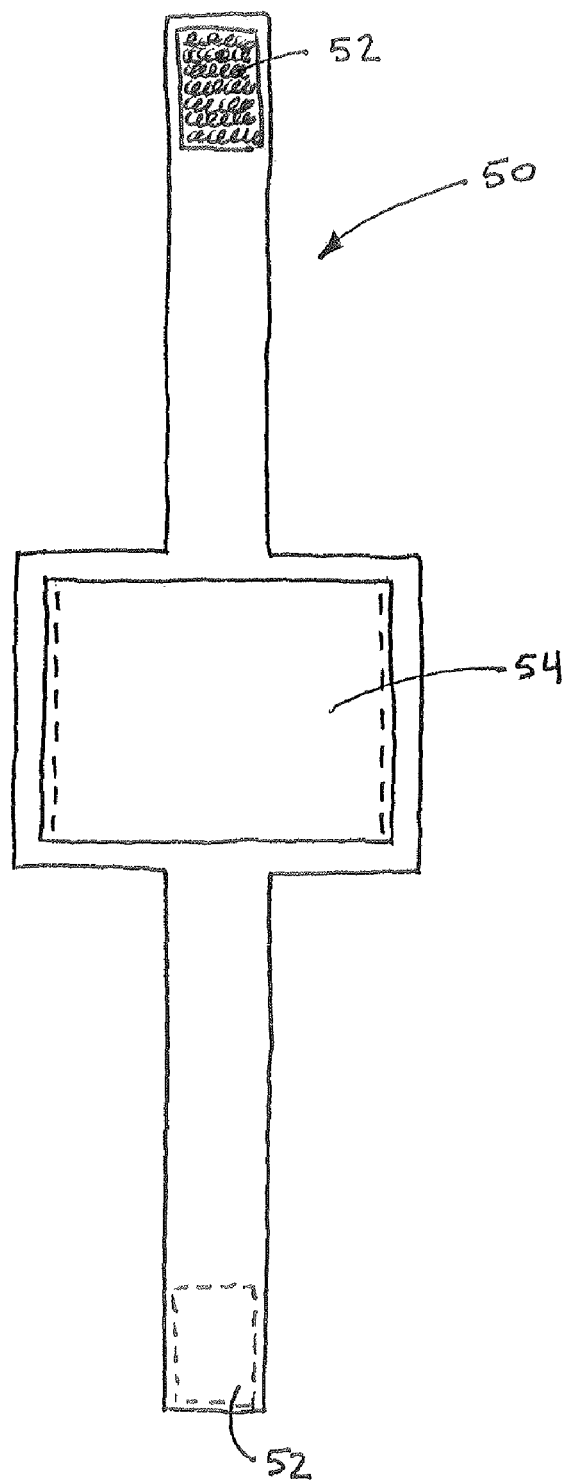
FIG. 5 is an illustration of a user adjustable strap for use with the holder of FIG. 1.

Each of side walls 14 preferably includes a receiving assembly to allow users to attach various user-adjustable carrying assemblies for carrying the holder 10. In a preferred embodiment, the receiving assembly is a loop 22 positioned along each side wall 14, configured to receive a user-adjustable carrying strap 50 (shown in FIG. 5), which may be used as a belt strap, an armband, or similar body-worn carrying strap. The carrying strap 50 may be adjustable with hook and loop fabric sections 52 to accommodate different diameters of users' arms, and includes a central oversewn sleeve 54 to receive a user's belt. Similarly, top wall 16 and bottom wall 18 may also include a receiving assembly for connection with various user adjustable carrying assemblies. Top wall 16 may be preferably provided loop 24 configured to receive a neck strap and/or a carrying strap.

Figure 3:
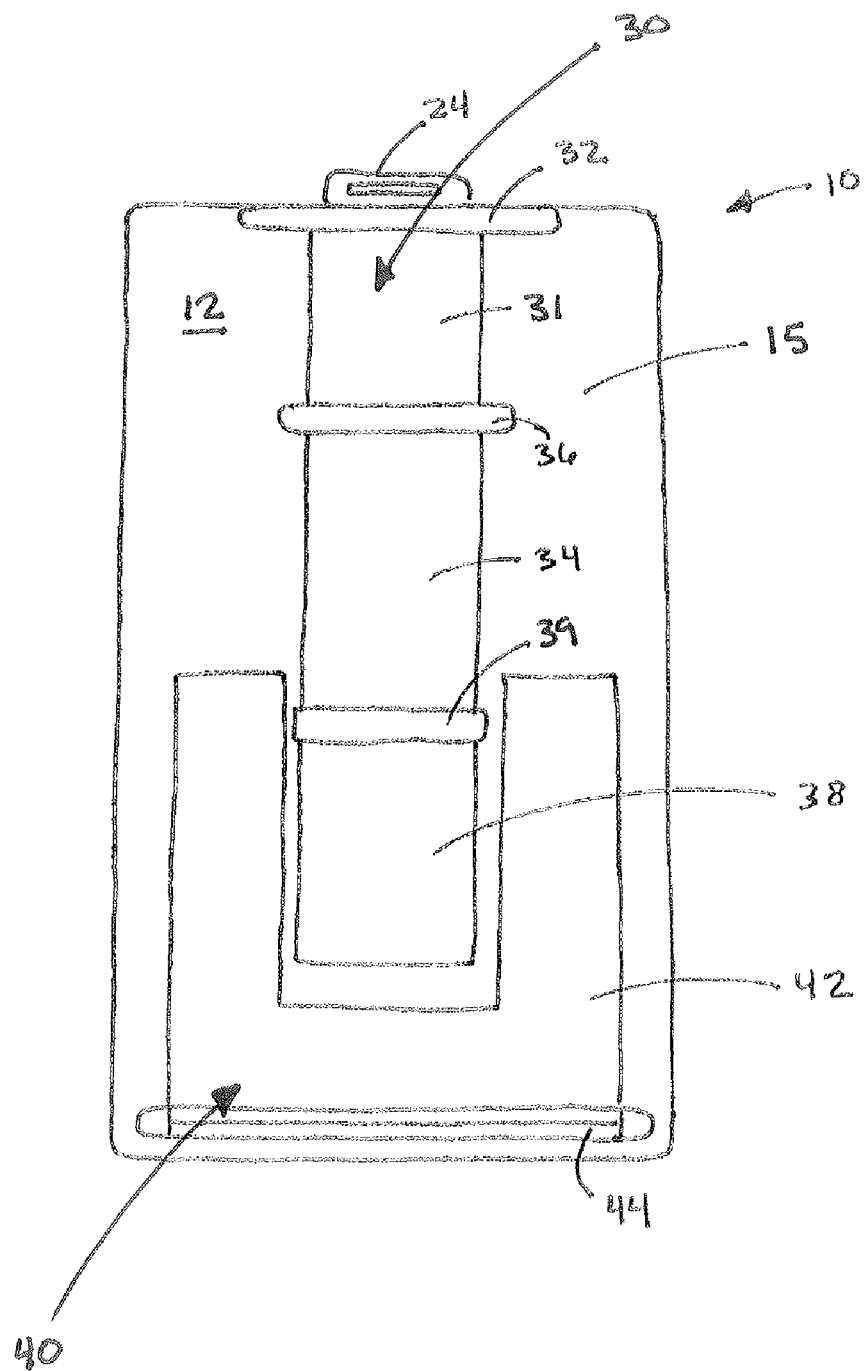
FIG. 3 is a rear view of the holder of FIG. 1.
Figure 4:
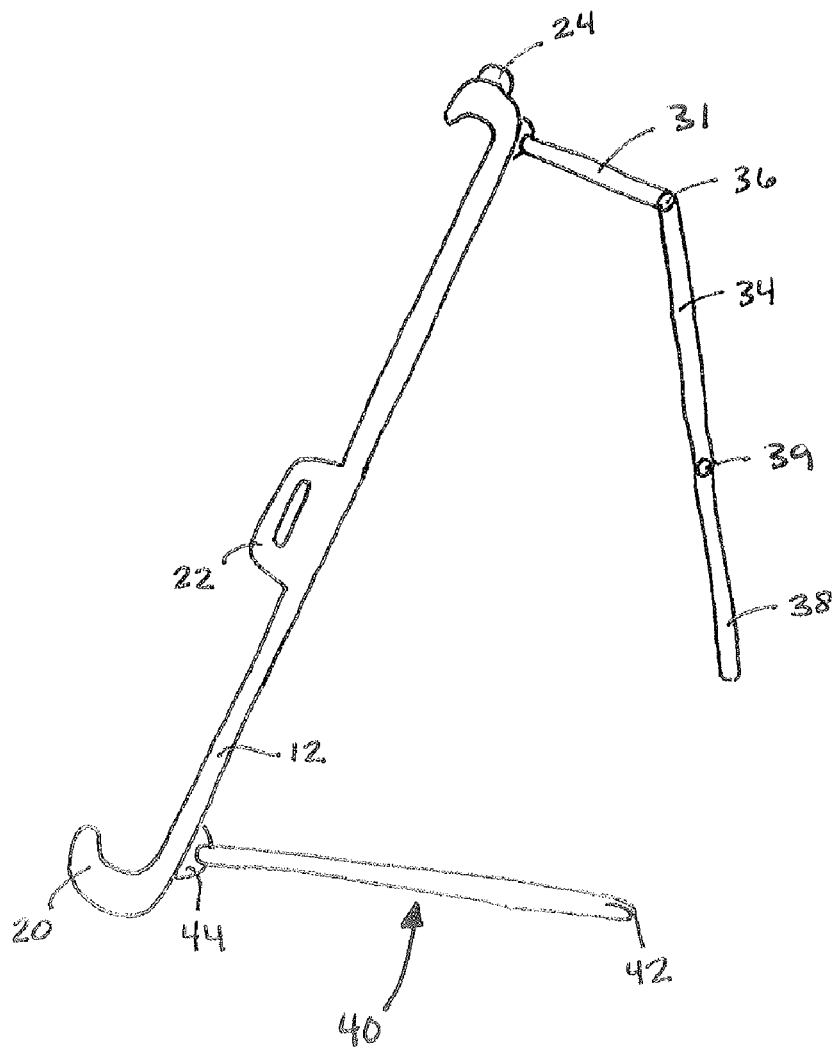
FIG. 4 is a side view of the holder of FIG. 1.

As shown in FIG. 3, connected to a second tray side 15 of tray 12 is a mounting assembly 30. Mounting assembly 30 preferably includes a plurality of hinge members configured to serve as adjustable supports for holder 10 in various environments. It is contemplated that the mounting assembly 30 will allow the holder 10 to be secured in a position against non-horizontal surfaces. A first hinge member comprises a hinge plate 31 that is attached to tray 12 using an indexed hinge or friction hinge 32, such that the angular position of hinge plate 31 may be modified and held in various angular positions with respect to tray 12. A second hinge member comprises a second hinge plate 34 that is attached to hinge plate 31 using an indexed hinge or friction hinge 36, such that the angular position of hinge plate 34 may be modified and held in various angular positions with respect to hinge plate 31. Preferably, a third hinge member comprises a third hinge plate 38 that is attached to hinge plate 34 using an indexed hinge or friction hinge 39, such that the angular position of hinge plate 38 may be modified and held in various angular positions with respect to hinge plate 34. As shown in FIG. 4, the mounting assembly 30 may be configured to provide a finger hook type of arm with three friction or indexed hinges that allow such hook to adjust to a number of positions, such that it may hook over a vertical or semi-vertical surface to allow the front of the portable electronic device to be viewed. By way of example only (and not by way of limitation), such hook may be used to temporarily attach the tray 12 to a semi-vertical surface such as a seat-back table tray on an aircraft with the electronic device remaining viewable by the passenger seated behind such seat-back table tray. The indexed hinges or friction hinges 32, 36, and 39 allow the viewing angle of the electronic device to be varied so that it can be properly viewed by the passenger.

Hinge plates 31, 34, and 38 preferably fold flat onto the second tray side 15 of tray 12 for storage and ease of transport, and need not be removed from tray 12 for use of the electronic device. It is further contemplated that the number of hinged members may be greater than the three that are shown and described herein without departing from the scope and spirit of the current invention.

Also mounted on the second tray side 15 of tray 12 (and as shown in FIGS. 3 and 4) is a support assembly 40. The support assembly 40 preferably includes a forked base leg 42 that is attached to tray 12 with an indexed hinge or friction hinge 44 that allows the electronic device to be rested on a flat or semi-flat surface to allow the portable electronic device to be viewed by a user. Once again, forked base leg 42 allows variable viewing angles for the user to see the video screen at the correct and/or preferred angle. The forked base leg 42 likewise folds flat against the second tray side 15 of tray 12 so that it need not be removed from tray 12 for overall use of the case.

It is contemplated that holder 10 may include either the mounting assembly 30 or the support assembly 40. Further, the connection of the mounting assembly 30 may be at a position upon the second tray side 15 of tray 12 that is different from or similar to the connection of the support assembly 40. Preferably, mounting assembly 30 is connected generally proximal to top wall 16, via hinge 32. Also, it is preferable that support assembly 40 be connected generally proximal to bottom wall 18, via hinge 44. Moreover, when both mounting assembly 30 and support assembly 40 are provided, it is preferred that when both are placed in a storage position (flat against second tray side 15 of tray 12), at least a portion of mounting assembly 30 fits between the forked base legs 42 of support assembly 40 so as to maximize the useful area of both mounting assembly 30 and support assembly 40 while minimizing the amount of space needed to store such elements.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. Further, the method of using the invention may employ the above described functional capabilities in various ways, enabling one or many of the features without regard to any specific hierarchical order. It is the intention of the following claims to encompass and include such changes.

What is claimed is:

1. A holder for portable electronic devices, comprising:
   a tray having a first tray side and configured to receive and secure a portable electronic device via a compression fit to said first tray side;
   a mounting assembly connected to a second tray side, said mounting assembly further comprising a plurality of hinge members that are user-configurable to secure the tray assembly to a non-horizontal surface and to position and hold said portable electronic display in a user-determined position with respect to said non-horizontal surface; and
   a support assembly connected to the second tray side, said support assembly further comprising a forked base let configured to support said holder on a flat surface such that an electronic device positioned in said holder is viewable by said user.

2. The holder of claim 1, wherein said tray further comprises side, top, and bottom walls configured to secure said portable electronic device via said compression fit.

3. The holder of claim 2, wherein the walls include protective corners that overlap corners of the portable electronic device when such device is seated within the tray.

4. The holder of claim 2, wherein the walls include a receiving assembly configured to receive a user-adjustable carrying strap.

5. The holder of claim 4, wherein the receiving assembly comprises a loop configured to receive said user-adjustable carrying strap.

6. The holder of claim 1, wherein the holder is formed of materials selected from the group consisting of polyethylene, polypropylene, and polyurethane.

7. The holder of claim 1, wherein each of said hinge members comprises a hinge connected to a hinge plate.

8. The holder of claim 7, wherein each said hinge comprises a friction hinge.

9. The holder of claim 7, wherein each said hinge comprises an indexed hinge.

10. The holder of claim 1, wherein said mounting assembly further comprises at least three hinge members.

11. A holder of portable electronic devices, comprising:
a tray having side, top, and bottom walls for receiving and securing to a first tray side a portable electronic device via a compression fit;
a mounting assembly connected to a second tray side, said mounting assembly further comprising a plurality of hinge members, said hinge members being configurable to secure the holder against a non-horizontal surface; and
a support assembly connected to the second tray side, said support assembly further comprising a forked base leg configured to support said holder on a flat surface such that an electronic device positioned in said holder is viewable by said user.

12. The holder of claim 11, wherein the mounting assembly further comprises at least three hinge members, wherein each of said hinge members comprise a hinge connected to a hinge plate.

13. The holder of claim 12, wherein each of said hinges comprises a friction hinge.

14. The holder of claim 12, wherein each of said hinges comprises an indexed hinge.

15. The holder of claim 11, wherein said forked base leg is hingedly attached to said second tray side.

16. The holder of claim 11, wherein said holder is formed of materials selected from the group consisting of polyethylene, polypropylene, and polyurethane.

17. The holder of claim 11, wherein at least one of said walls includes a loop for receiving a user-adjustable carrying strap.

* * * * *